(No Model.)
C. A. GILDEMEYER.
WHEEL TIRE.
No. 508,610. Patented Nov. 14, 1893.
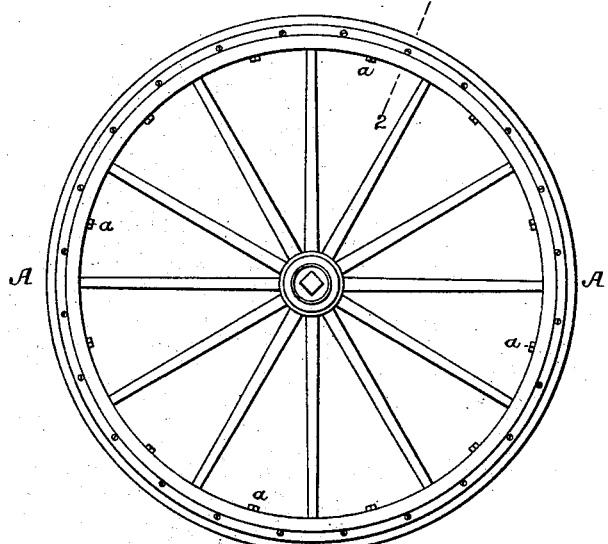
FIG. 1.
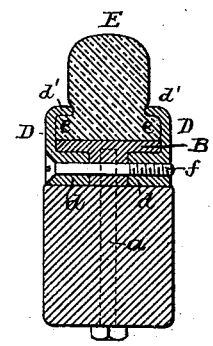
FIG. 2.
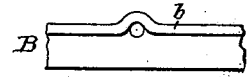
FIG. 6.
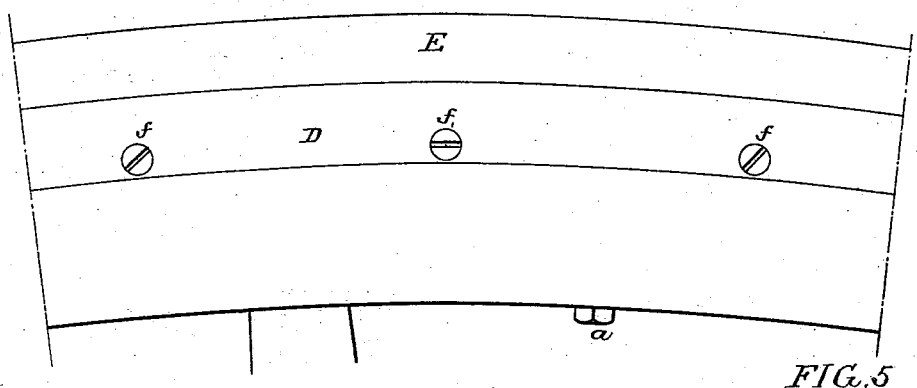
FIG. 3.
FIG. 4.
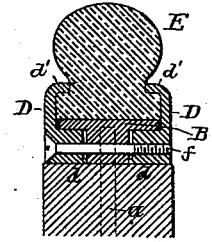
FIG. 5.
Witnesses:
R. Schleicher
Alex. Barkoff
Inventor:
Charles A. Gildemeyer
by his Attorneys
Howson & Howson

UNITED STATES PATENT OFFICE.

CHARLES A. GILDEMEYER, OF HADDONFIELD, NEW JERSEY.

WHEEL-TIRE.

SPECIFICATION forming part of Letters Patent No. 508,610, dated November 14, 1893.

Application filed March 7, 1893. Serial No. 465,025. (No model.)

*To all whom it may concern:*

Be it known that I, CHARLES A. GILDE-MEYER, a citizen of the United States, and a resident of Haddonfield, Camden county, New Jersey, have invented certain Improvements in Wheel-Tires, of which the following is a specification.

The object of my invention is to rigidly clamp a flexible or yielding tire to a wheel in such a manner that the tire will not become detached from the wheel when used. This object I attain in the following manner, reference being had to the accompanying drawings, in which—

Figure 1, is a side view of a carriage wheel illustrating my invention. Fig. 2, is a sectional view on the line 1—2, Fig. 1, drawn to an enlarged scale. Fig. 3, is an enlarged side view of a portion of the wheel. Fig. 4, is a detached perspective of a portion of the clamps. Figs. 5 and 6, are views illustrating modifications of the invention.

A is a wheel of the ordinary construction with a plain felly, and mounted on this felly is a ring B, T-shaped in cross section secured to the felly at intervals by bolts $a$ which pass through the felly and into the ring. Mounted at each side of the ring B is an annular clamp plate D. The rings have a portion $d$ which passes under the flanges $b$ of the ring B, and have portions $d'$ which overlap the ribs $e$ on each side of the flexible tire E, which is preferably shaped as clearly shown in Fig. 2. This tire I prefer to make solid and of rubber, but it may be made hollow or may be inflated without departing from my invention.

The tire is mounted directly upon the ring B, and when the clamp plates are placed at each side of the ring and overlap the ribs of the tire, the clamp screws $f$ are passed through the clamps and the ring B, and on turning these screws the clamp plates are drawn together and upon the tire firmly securing it in position, and preventing it from becoming detached from the wheel. The clamp plates may be in the form of rings or in segments of rings as they are secured when in position to the ring B which is rigidly fixed to the felly.

In Fig. 4, I have shown the ring and the clamps cut away at intervals so as to make the parts lighter, and in Fig. 5, I have shown projections on the lower portion of each clamp which rest against the ring so that the clamps are in the form of levers using this point of contact as the fulcrum.

In Fig. 6, I have shown the flanges $b$ raised at intervals so that the opening through the ring for the passage of the screws will be more central.

By the construction above described the tire is securely fastened to the wheel, the wheel felly is not specially prepared to receive the tire, and the ring B can be shrunk upon the wheel the same as the ordinary tire, or secured thereto by bolts alone; and furthermore the clamps on each side are so proportioned as to make the device about the same width as the felly, and the outer surfaces of the clamps are free of projections. Consequently the wheel will resemble the ordinary metal tired wheel.

I claim as my invention—

1. The combination in a wheel, of the flanged ring secured to the felly, a flexible tire mounted on said ring, side clamps secured to the said flanged ring and the tire, substantially as described.

2. The combination in a wheel, of the ring mounted upon the wheel, a flexible tire and side clamps bearing upon the ring and tire, with screws passing through the ring and clamps confining the tire, substantially as set forth.

3. The combination in a wheel, of the ring T-shaped in cross section secured to the wheel, the side clamps passing under the ring and over flanges on the tire, with transverse clamp screws for drawing the rings toward each other and upon the tire, substantially as set forth.

4. The combination of the wheel, the ring secured thereto, a flexible tire having side ribs, clamps mounted on each side of the ring and tire, and having portions extending under the ring and over the rib on the tire, with transverse clamp screws for securing the clamps upon the ring and tire, substantially as described.

In testimony whereof I have signed my name to this specification in the presence of two subscribing witnesses.

CHARLES A. GILDEMEYER.

Witnesses:
HENRY HOWSON,
JOSEPH H. KLEIN.